United States Patent [19]

Bolton

[11] Patent Number: 4,941,073
[45] Date of Patent: Jul. 10, 1990

[54] WEDGE SHAPED FLASHLIGHT

[76] Inventor: Ronald R. Bolton, 2526 Jacaranda, Orange, Calif. 92667

[21] Appl. No.: 426,013

[22] Filed: Oct. 24, 1989

[51] Int. Cl.$^5$ .............................................. B60Q 1/00
[52] U.S. Cl. ................................... 362/80.1; 362/119; 362/184; 362/188; 362/234; 81/15.9
[58] Field of Search ............... 362/109, 119, 120, 253, 362/234, 157, 184, 200, 187, 188, 80.1; 81/15.9; 70/394, 415

[56] References Cited

U.S. PATENT DOCUMENTS

| 1,369,378 | 2/1921 | Berberian | 362/119 |
|---|---|---|---|
| 3,919,541 | 11/1975 | Chao | 362/120 |
| 4,622,868 | 11/1986 | Flannigan | 81/15.9 |
| 4,662,947 | 5/1987 | Hopkins | 362/119 |
| 4,669,186 | 6/1987 | Liu | 362/119 |
| 4,836,061 | 6/1989 | Weinraub | 81/15.9 |

FOREIGN PATENT DOCUMENTS 21954 2/1936 Australia .............................. 362/116

Primary Examiner—Ira S. Lazarus
Assistant Examiner—D. M. Cox
Attorney, Agent, or Firm—Gary Appel

[57] ABSTRACT

A wedge-shaped flashlight, especially adapted for being inserted between a closed window of a vehicle door and the exterior rain seal at lower regions thereof so as to create a gap between the window and the rain seal and to enable the illumination of the inside of said door, comprises a body portion and a flashlight portion. The body portion is formed having a first wedge-shaped region at one end of the body and a second wedge-shaped region at the opposite end of the body, the first wedge shaped region having a first knife-edge and a first recess formed into the body portion from the first knife-edge, and the second wedge-shaped region having a second knife-edge and a second recess formed into the body portion from the second knife-edge, the first and second wedge-shaped regions having different angles of taper for use with different types of vehicles. The flashlight portion comprises a first flashlight bulb which extends into an aperture in the first recessed region so as to enable a beam of light from the first bulb to be directed generally toward the first knife-edge and a second flashlight bulb which extends into an aperture in the second recessed region so as to enable a beam of light from the second bulb to be directed generally toward the second knife-edge.

15 Claims, 2 Drawing Sheets

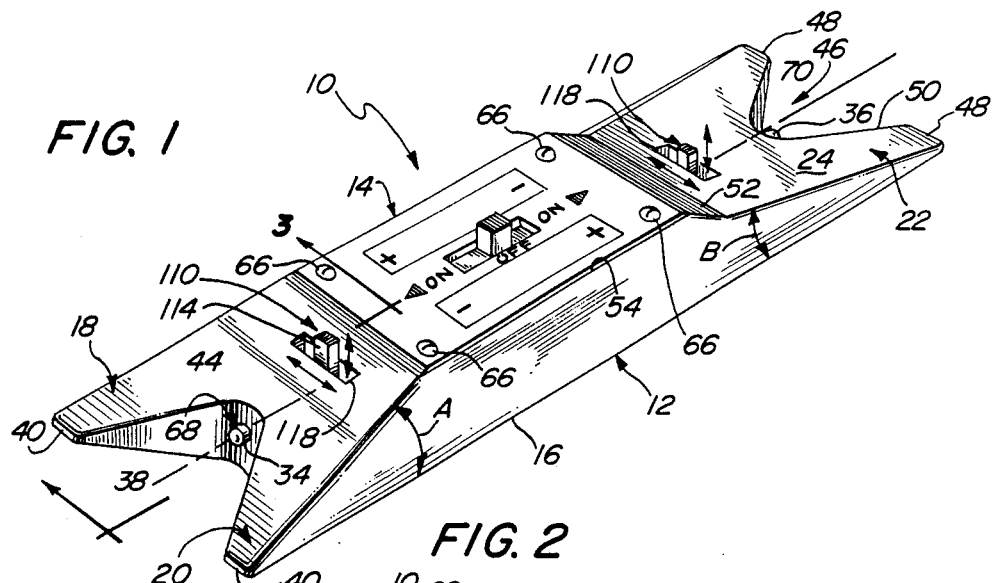
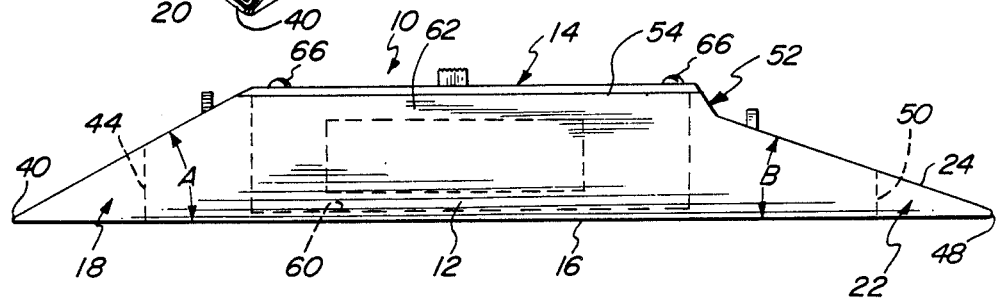
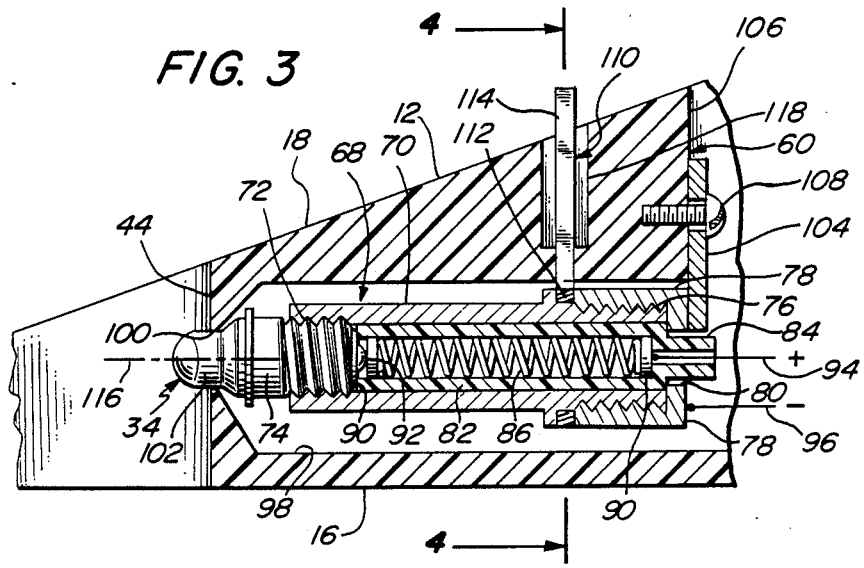

WEDGE SHAPED FLASHLIGHT

BACKGROUND OF THE INVENTION

1. Field of the Invention

The present invention relates generally to the field of flashlights and, more particularly, to special purpose flashlights configured for illuminating areas having limited access.

2. Discussion of the Prior Art

There are disclosed in various previous U.S. patents such as U.S. Pat. No. 4,836,061 mechanical apparatus for enabling the keyless unlocking of locked automobile doors from the outside by lawfully-acting individuals, such as peace officers, firemen, locksmiths, and tow truck operators, without damaging the automobile door or door locking mechanism. As described in such prior patents, the door unlocking apparatus includes a flat, slender tool, sometimes called a "Slim Jim", constructed of a strip of somewhat flexible metal which is shaped for being slid downwardly into a locked automobile door along the outside of the door's closed window. Such tool is disclosed as having an edge-opening slot near the lower end which forms a hook by means of which, after the tool is inserted into a hollow door, a mechanical door locking linkage inside the door may be engaged. Thereafter, the tool is manipulated until the linkage is moved sufficiently to unlock the door.

In another U.S. patents there is disclosed a different type of such door unlocking tool which is shaped for being inserted downwardly into an automobile door and for engaging a door locking/unlocking lever or button located on the door panel inside the automobile.

In both such applications, there was disclosed the use of a wedge configured for being inserted downwardly between the outside of the window of the locked door and the flexible rain seal at the bottom of the window so as to provide sidewardly adjacent access gaps for the tool between the window and the seal. These gaps enable the door unlocking tool to be inserted easily into the hollow door region and also enable the easier manipulation of the tool so that mechanical door locking linkages inside the door can be snagged by the tool (in one case) or so that the tool can engage the door locking/unlocking lever on the inside door panel (in the other case).

It can, perhaps, be appreciated that even in broad daylight the inside of automobile of other doors is very dark. In fact, the light contrast between the inside of the door and bright sunlight outside accentuates the darkness inside the door. As a result even in the daylight, manipulation of the door unlocking tools inside the door is usually done pretty much by feel, the locking linkage, for example, being "fished" for until it is snagged by the hook end of the tool. This means that the length of time required to unlock the door is increased over what should be possible, and in emergency situations this added unlocking time may have serious consequences.

The use of an ordinary flashlight to illuminate the inside of the door while the tool is being manipulated is usually unsatisfactory since it is difficult to shine the flashlight into the door through the small gap at one side of the wedge-shaped object and to manipulate the tool at the same time, particularly since the gaps at the edge of the wedge-shaped object are ordinarily quite narrow.

It is, therefore, a principal object of the present invention to provide means for effectively illuminating the inside of an automobile door while leaving both hands of an operator free to manipulate a door unlocking tool within the door, and without requiring the use of conventional electric lights, a source of power for which may not be readily or quickly available.

SUMMARY OF THE INVENTION

In accordance with the present invention, there is provided a combination wedge and flashlight apparatus adapted for being inserted between a closed window of a vehicle door and the exterior rain seal at lower regions thereof so as to create a gap between the window and the rain seal and so as to enable illumination of the inside of the door, the combination wedge and flashlight apparatus comprising an apparatus body formed having at least one wedge-shaped end region with a knife-edge, the wedge-shaped region having a recess formed into the body from the knife-edge. Further included in the apparatus are a flashlight means disposed in the body, including a flashlight bulb and means enabling said bulb to extend into an aperture in the body in the recessed region so as to enable a beam of light from the flashlight bulb to be directed generally toward the knife-edge when the bulb is energized from a voltage source in the body. Means are preferably included for enabling the positional adjustment of the flashlight bulb to thereby enable the beam of light from the bulb to be directed to different locations in the inside of a vehicle door in which the apparatus is installed.

In accordance with the preferred embodiment of the invention, and to enable the apparatus to be used with different types of vehicle doors, the body is formed having as first wedge-shaped region at one end of the body and having a second wedge-shaped region at the opposite end of the body, the first wedge shaped region having a first knife-edge and having a first recess formed into the body from the first knife-edge, the second wedge-shaped region having a second knife-edge and having a second recess formed into the body from the second knife-edge. In such case, it is preferred that the first wedge-shaped region have a first angle of taper and that the second wedge-shaped region have a second angle of taper which is different from the first angle of taper. It is then also preferred that the flashlight means include a first flashlight bulb and means enabling the first bulb to extend into an aperture in the body in the first recessed region, thereby enabling a beam of light from the first flashlight bulb to be directed generally toward the first knife-edge when the flashlight means are energized, and include a second flashlight bulb and means enabling the second bulb to extend into an aperture in the body of he second recessed region, thereby enabling a beam of light from the second flashlight bulb to be directed generally toward the second knife-edge when the flashlight means are energized.

When two flashlight bulbs are provided, it is further preferred that means be included for selectively connecting the first and second flashlight bulbs to a voltage source contained in the body so as to enable either bulb to be lit.

BRIEF DESCRIPTION OF THE DRAWINGS

The present invention can be more readily understood by a consideration of the following detailed description when taken in conjunction with the accompanying drawings in which:

FIG. 1 is a perspective drawing of a combination wedge and flashlight in accordance with the present invention, showing the wedge portion tapering at different angles at opposite ends and showing the location of a flashlight bulb at each end of the wedge;

FIG. 2 is a side view of the combination wedge and flashlight of FIG. 1, also showing the different taper at each end of the wedge portion;

FIG. 3 is a vertical cross-sectional drawing, taken along line 3—3 of FIG. 1, showing features of a flashlight bulb assembly portion of the combination wedge and flashlight, and showing electrical connections to the bulb assembly of a bulb moving member;

In the various FIGS. like elements and features are given the same reference number and/or other identification.

DESCRIPTION OF THE PREFERRED EMBODIMENT

Figure 4:
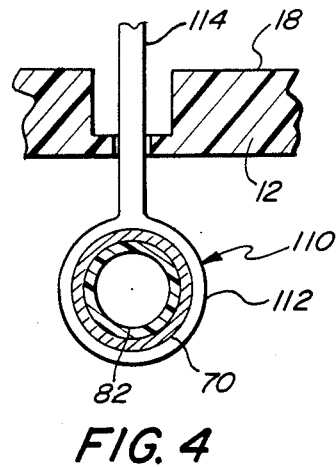
FIG. 4 is a transverse cross sectional drawing, taken along line 4—4 of FIG. 3, showing the connection of the bulb moving member to the flashlight bulb assembly.

There is depicted in FIG. 1 a combination wedge and flashlight 10 (hereinafter usually referred to as wedge/flashlight 10 for convenience), in accordance with the present invention. Wedge/flashlight 10 is particularly configured and adapted for use with a tool, such as a "Slim-Jim," for the lawful entry into a locked automobile, truck, RV, or the like vehicle.

As shown in FIG. 1, wedge/flashlight 10 comprises generally a wedge or body portion 12 and a flashlight portion 14. Preferably, body portion 12 is constructed of a relatively soft, yet relatively rigid, plastic so that when wedge/flashlight 10 is used to assist the keyless opening of a locked vehicle door, the body portion will not scratch the window against which it is slid downwardly into the vehicle door.

Body portion 12 preferably has a substantially flat bottom surface 16 which is generally rectangular in outline, being substantially longer than it is wide (FIGS. 1 and 2). Although not required, bottom surface 16 may be slightly corrugated so that is helps keep wedge/flashlight 10 in position after it has been inserted between a door window and rain seal and so that the wedge/flashlight is not pushed up out of the door by a ramping action on sloping surfaces thereof.

It is preferred, as shown in FIGS. 1 and 2, that each end region of body portion 12 be formed at a different wedge angle so that the wedge/flashlight 10 is better adapted for inserting into different types of vehicle doors. Accordingly, a first end region 18 of body portion 12 is formed having a first inclined, wedging surface 20 at a first angle "A" relative to bottom surface 16, and the opposite end region 22 of the body portion is formed having a second inclined surface 20 which is at an angle "B" relative to the bottom surface. As is indicated in FIGS. 1 and 2, angle "A" is substantially greater than angle "B". It is, of course, to be understood that wedge/flashlight 10 may alternatively be constructed with a wedge shape at only one end without falling outside the scope of the present invention. When, as illustrated in FIGS. 1 and 2, wedge/flashlight 10 is formed having first and second wedge regions 18 and 22 at opposite ends of body portion 12, there are provided first and second flashlight bulbs 34 and 36 (FIG. 1) which are installed in the body portion in the corresponding first and second wedge regions of the body portion, as more particularly described below.

First wedge region 18 of body portion 12 is formed having a shallow V- or U-shaped recess 38 from an end knife-edge 40, along a longitudinal axis 42, towards the center of the body portion (FIG. 1). Recess 38 is defined by a body surface 44 which is preferably perpendicular to bottom surface 16. First flashlight bulb 34 projects outwardly through surface 44 towards edge 40 in the vertical plane of axis 42.

A corresponding, shallow V- or U- shaped recess 46 is formed in second wedge end region 22, from an end knife-edge 48, towards the center of body portion 12, along axis 42. Recess 46 is defined by a surface 50, which is preferably perpendicular to bottom surface 16, through which second flashlight bulb 36 projects so as to able to shine light towards end knife-edge 48.

As seen from FIGS. 1 and 2, a stepped surface region 52 connects inclined surface 24 at second end region 22 of body portion 12 with an upper surface 54 of the body portion, such upper surface preferably being parallel to bottom surface 16. Formed downwardly into body 12, from upper surface 54 thereof, is a generally rectangular recess 60 (FIG. 2) sized for containing flashlight batteries 62 and other electrical parts of flashlight portion 14. A detachable cover plate 64 (FIGS. 1 and 2), also generally rectangular in shape, is attached, as by four corner screws 66, to upper surface 54 in a position covering recess 60.

Flashlight portion 14 comprises, in addition to batteries 62, respective first and second flashlight bulb assemblies 68 and 70 (FIG. 1), which include respective flashlight bulbs 34 and 36, and which are preferably identical in construction. Flashlight bulb assembly 68, as illustrated in FIG. 3, is preferably constructed in a manner which enables bulb 34 to be manually swiveled at least somewhat, relative to body 12, so that a beam of light from the bulb can be directed to various points within a vehicle door in which apparatus 10 is inserted so as to enable an individual using a door unlocking tool to visually see the internal door locking mechanism when looking through a gap to the side of the apparatus and thereby enable the tool to engage such mechanism with a minimum of "fishing."

To this end, flashlight bulb assembly 68 includes an electrically conductive, elongate tubular member 70 having an internally threaded region 72 at one end which enables the member to be threaded onto a base portion 74 of bulb 34, the other end of member 70 is externally threaded at a region 76 for receiving an electrically conductive end cap 78 having a central aperture 80. Disposed within member 70 is a non-conductive tubular sleeve 82 having a necked-down region 84, at its rearward end, which extends outwardly through aperture 80 in end cap 78.

Installed inside of sleeve 82 is an electrically conductive coil spring 86 which has connected disc 90, the forward one of which bears against a bulb filament connection 92 at the bottom of bulb 34 and the rearward one of which bears against the necked-down region 84 of sleeve 82. A positive polarity electrical wire 94, which extends through the inside of necked-down region 84, is electrically connected to the rearward one of discs 90. As a result, wire 94 makes electrical contact with filament connection 92 through discs 90 and spring 86. A negative polarity electrical wire 96 is connected to end cap 78, thereby making electrical contact with bulb base 74 through the end cap and member 70.

Bulb assembly 68 is received in a larger diameter, cylindrical recess recess formed forwardly from recess 60, a small aperture 100 at the forward end of recess 98 opening through to surface 40. The diameter of aperture 100 is sufficient to permit a forward, lens portion 102 of bulb 34 to project outwardly beyond surface 40 so as to point generally toward knife-edge 40. The diameter of cylindrical recess 98 is sufficiently larger than the outer diameter of flashlight assembly member 70 to permit the assembly to pivot through a significant angle with the pivot "point" being established where bulb lens portion 102 contacts portions of body 12 which define bulb aperture 100.

Flashlight assembly 68 is retained in its cylindrical recess by a spring clip 104 which is attached to a forward surface 106 of recess 60 by a screw 108. Spring clip 104 bears against a base 109 of end cap 78.

Manual pivoting of flashlight bulb assembly 68 is enabled by a level 110 (FIGS. 3 and 4) which comprises a ring 112 which encircles member 70 and an arm 114 perpendicular to the ring. Arm 114 extends radially upward from a longitudinal axis 116 of flashlight bulb assembly 68 out through a stepped aperture 118 in body 12. Such aperture 118 is configured to permit lever arm 114 to be moved from side to side and up and down, to thereby enable limited pivotal movement of flashlight assembly 68 relative to body 12. Lever ring 112 is retained against axial movement along member 70 by being confined between a narrow angular flange 120 formed around the member and a forward-facing angular surface of end cap 78 (FIG. 3).

The other flashlight assembly 70 is similarly constructed and installed in body 12 at second end region 22 thereof.

Figure 5:
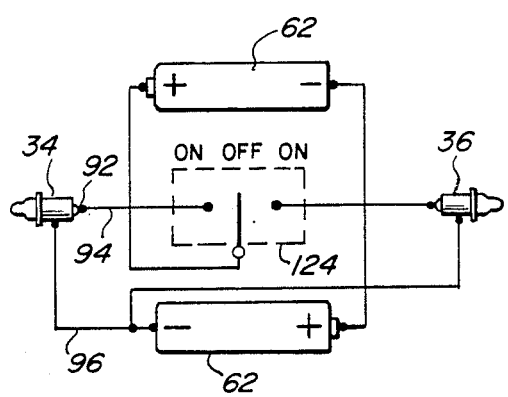
FIG. 5 is an electrical schematic drawing of the flashlight portion of the combination wedge and flashlight of FIG. 1.

A typical electrical circuit for flashlight portion 14 is depicted in FIG. 5. As shown, bulbs 34 and 36 are connected in parallel to two batteries 62 and are separately controlled through an "ON-OFF-ON" switch 124 which enables either bulb to be turned on. Batteries 62 may, for example be conventional; size "AA" or "AAA" 1.5 volt batteries, and are retained in body recess 60 by conventional battery clip (not shown) which make electrical contact with ends of the batteries.

Figure 6:
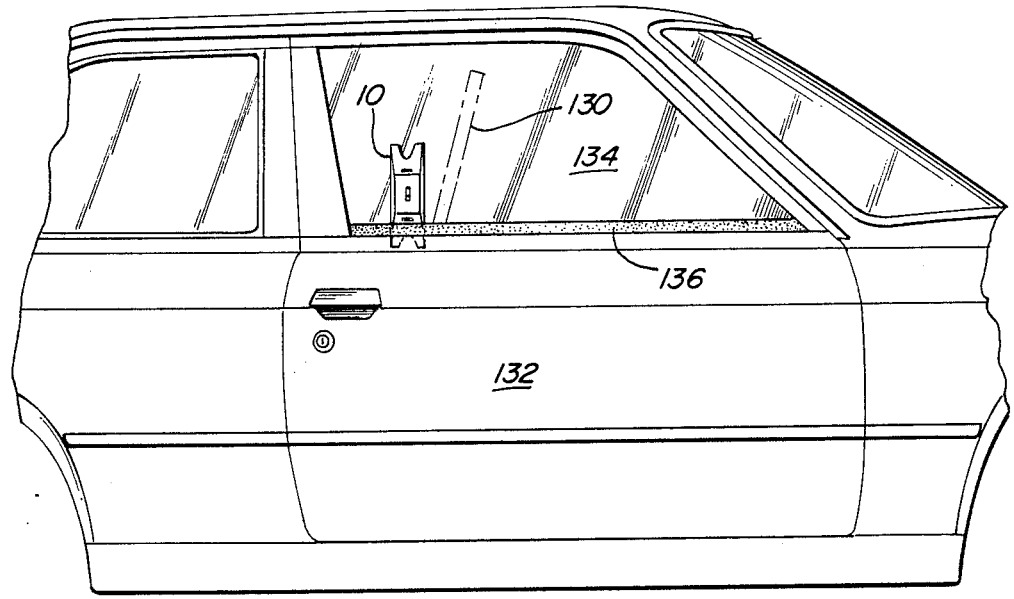
FIG. 6 is a side view of an exemplary automobile showing the manner in which the combination wedge and flashlight is inserted into a door of the automobile in a typical location for assisting in the keyless unlocking of the door by a "Slim-Jim.
Figure 7:
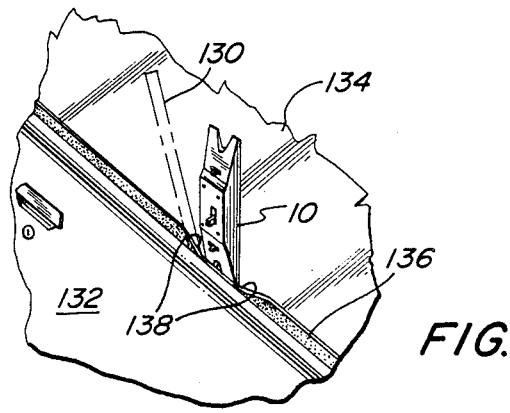
" and FIG. 7 is a perspective drawing showing the region of the automobile door in which the combination wedge and flashlight is installed.

FIGS. 6 and 7 illustrate the manner in which wedge/-flashlight apparatus 10 is used in combination with a door unlocking tool 130 (shown in phantom lines). As depicted, one end of apparatus 10 is inserted downwardly into a vehicle door 132 along the outside of a closed door window glass 134 and between the glass and a flexible, exterior rain seal at the outside window sill. As a result of the apparatus being installed in this manner, a gap 138 is created on each side of body 12 between window glass 134 and seal 136. Tool 130 can be inserted downwardly into door 132 through one of gaps 138 and the operator can peer downwardly into the inside of the door through the other gap, the interior of the door being illuminated by the appropriate one of the energized flashlight bulbs 34 or 36. As a result, the operator can see the interior locking linkages and see where to snag the mechanism with the lower end of tool 130 so that the door 132 can be unlocked by pulling (with the tool) on the mechanism.

Although there is described above a specific arrangement of a combination wedge and flashlight, especially for use with a tool for the keyless unlocking of locked vehicle doors, in accordance with the present invention for the purpose of illustrating the manner in which the invention can be used to advantage, it is to be appreciated that the invention is not limited thereto. Accordingly, any and all variations and modifications which may occur to those skilled in the art are to be considered to be within the scope of the invention as defined by the appended claims.

What is claimed is:

1. A combination wedge and flashlight apparatus for the illumination of the inside of a vehicle door, said combination wedge and flashlight apparatus comprising:
   a. An apparatus body formed having at least one wedge-shaped end region with a knife-edge, said wedge-shaped region having a recess formed into said body from said knife-edge, said body being shaped for enabling the insertion of said wedge-shaped region downwardly between lower, outside regions of a closed window of a vehicle door and an exterior rain seal thereof so as to create a gap between the window and the rain seal through which the interior of the door can be seen; and
   b. Flashlight means disposed in said body, said flashlight means including a flashlight bulb and means enabling said bulb to extend into an aperture in said body in said recessed region, thereby enabling a beam of light from said flashlight bulb to be directed generally toward said knife-edge when said flashlight means are energized and thereby into the inside of a vehicle door into which the body is inserted for the illumination thereof.

2. A combination wedge and flashlight apparatus adapted for being inserted between a closed window of a vehicle door and the exterior rain seal at lower regions thereof so as to create a gap between the window and the rain seal and so as to enable illumination of the inside of said door, said combination wedge and flashlight apparatus comprising:
   a. An apparatus body formed having at least one wedge-shaped end region with a knife-edge, said wedge-shaped region having a recess formed into said body from said knife-edge;
   b. flashlight means disposed in said body, said flashlight means including a flashlight bulb and means enabling said bulb to extend into an aperture in said body in said recessed region, thereby enabling a beam of light from said flashlight bulb to be directed generally toward said knife-edge when said flashlight means are energized; and:
   c. means for enabling the positional adjustment of said flashlight bulb so as to enable the direction of the beam of light from said bulb to be change.

3. The combination wedge and flashlight apparatus as claimed in claim 1, wherein the apparatus body is formed having a first wedge-shaped region at one end of the body and having a second wedge-shaped region at the opposite end of the body, said first wedge-shaped region having a first knife-edge and having a recess formed into said body from said first knife-edge, said second wedge-shaped region having a second recess formed into said body from said second knife-edge.

4. The combination wedge and flashlight apparatus as claimed in claim 3, wherein said first wedge-shaped region has a first angle of taper and said second wedge-shaped region has a second angle of taper which is different from said first angle of taper.

5. The combination wedge and flashlight as claimed in claim 3, wherein said flashlight means include a first flashlight bulb and means enabling said first bulb to extend into an aperture in said body in said first recessed region, thereby enabling a beam of light from said first flashlight bulb to be directed generally toward said first knife edge when said flashlight means are energized, and include a second flashlight bulb and means enabling said second bulb to extend into an aperture in said body in said second recessed region, thereby enabling a beam of light from said second flashlight bulb to be directed generally toward said second knife-edge when said flashlight means are energized.

6. The combination wedge and flashlight apparatus as claimed in claim 5, wherein the flashlight means include a voltage source and means for selectively connecting said first and second flashlight bulbs to said voltage source so as to energize either selected flashlight bulb.

7. A combination wedge and flashlight apparatus adapted for being inserted between a closed window of a vehicle door and the exterior rain seal at lower regions thereof so as to create a gap between the window and the rain seal and so as to enable illumination of the inside of said door, said combination wedge and flashlight apparatus comprising:
   a. an apparatus body formed having at least one wedge-shaped end region with a knife edge, said wedge shaped region having a recess formed into said body from said knife-edge;
   b. flashlight means disposed in said body, said flashlight means including a voltage source and flashlight bulb and means enabling said bulb to extend into an aperture in said body in said recessed region, thereby enabling a beam of light from said flashlight bulb to be directed generally toward said knife-edge when said flashlight bulb is electrically connected to said voltage source; and,
   c. means for enabling the positional adjustment of said flashlight bulb so as to enable the direction of the beam of light from said bulb to be selectively varied by an operator.

8. The combination wedge and flashlight apparatus as claimed in claim 7, where in the apparatus body is formed having a first wedge-shaped region at one end of the body and having a second wedge-shaped region at the opposite end of the body, said first wedge-shaped region having a first knife-edge and having a first recess formed into said body from said first knife-edge, said second wedge-shaped region having a second knife-edge and having a second recess formed into said body from said second knife-edge, and wherein said first wedge-shaped region has a first angle of taper and said second wedge-shaped region has a second angle of taper, which is different from said first angle of taper.

9. The combination wedge and flashlight apparatus as claimed in claim 8, wherein said flashlight means include a first flashlight bulb and means enabling said first bulb to extend into an aperture in said body in said first recessed region, thereby enabling a beam of light from said first flashlight bulb to be directed generally toward said first knife-edge when said flashlight means are energized, and include a second flashlight bulb and means enabling said second bulb to extend into an aperture in said body in said second recessed region, thereby enabling a beam of light from said second flashlight bulb to be directed generally toward said second knife-edge when said flashlight means are energized, and wherein the flashlight means include a voltage source and means for selectively connecting said first and second flashlight bulbs to said voltage source so as to energize either selected flashlight bulb.

10. A combination wedge and flashlight apparatus adapted for being inserted between a closed window of a vehicle door and the exterior rain seal at lower regions thereof so as to create a gap between the window and the rain seal and so as to enable illumination of the inside of said door, said combination wedge and flashlight apparatus comprising:
   a. an apparatus body formed having a first wedge-shaped region at one end of the body and having a second wedge-shaped region at the opposite end of the body, said first wedge-shaped region having a first knife-edge and having a first recess formed into said body from said first knife-edge, said second wedge-shaped region having a second knife-edge and having a second recess formed into said body from said second knife-edge; and,
   b. flashlight means disposed in said body, said flashlight means include a first flashlight bulb and means enabling said first bulb to extend into a aperture in said body in said first recessed region, thereby enabling a beam of light from said first flashlight bulb to be directed generally toward said first knife-edge when said flashlight means are energized, and include a second flashlight bulb and means enabling said second bulb to extend into a aperture in said body in said second recessed region, thereby enabling a beam of light from said second flashlight bulb to be directed generally toward said second knife-edge when said flashlight means are energized.

11. The combination wedge and flashlight apparatus as claimed in claim 10, including means for enabling the positional adjustment of said first and second flashlight bulbs s as to enable the direction of the beams of light from said bulbs to be changed.

12. The combination wedge and flashlight apparatus as claimed in claim 10, wherein said first wedge-shaped region has a first angle of taper and said second wedge-shaped region has a second angle of taper which is different from said first angle of taper.

13. The combination wedge and flashlight apparatus as claimed in claim 12, wherein the flashlight means include a voltage source and means for selectively connecting said first and second flashlight bulbs to said voltage source so as to energize either selected flashlight bulb.

14. A combination wedge and flashlight apparatus adapted for being inserted between a closed window of a vehicle door and the exterior rain seal at lower regions thereof so as to create a gap between the window and the rain seal and so as to enable illumination of the inside of said door, said combination wedge and flashlight apparatus comprising:
   a. an apparatus body formed having a first wedge-shaped region at one end of the body and having a second wedge-shaped region at the opposite end of the body, said first wedge-shaped region having a first knife-edge and having a first recess formed into said body from said first knife-edge, said second wedge-shaped region having a second knife-edge and having a second recess formed into said body from said second knife-edge, said first wedge-shaped region having a first angle of taper and said second wedge shaped region having a second angle of taper which is different from said first angle of taper;

b. flashlight means disposed in said body, said flashlight means include a first flashlight bulb and means enabling said first bulb to extend into an aperture in said body in said first recessed region, thereby enabling a beam of light from said first flashlight bulb to be directed generally toward said first knife-edge when said flashlight means are energized, and include a second flashlight bulb and means enabling said second bulb to extend into a aperture in said body in said second recessed region, thereby enabling a beam of light from said second flashlight bulb to be directed generally toward said second knife-edge when said flashlight means are energized, the flashlight means including a voltage source and means for selectively connecting said first and second flashlight bulbs to said voltage source so as to energize either selected flashlight bulb.

15. The combination wedge and flashlight apparatus as claimed in claim 14, including means for enabling the positional adjustment of said first and second flashlight bulbs so as to enable the direction of the beams of light from said bulbs to be changed.

* * * * *